United States Patent
Sanguineti et al.

(10) Patent No.: US 12,152,137 B2
(45) Date of Patent: Nov. 26, 2024

(54) POLYMERIC COMPOSITIONS COMPRISING VDF POLYMERS AND GRAPHITE

(71) Applicant: SOLVAY SPECIALTY POLYMERS ITALY S.P.A., Bollate (IT)

(72) Inventors: Aldo Sanguineti, Milan (IT); Marco Mirenda, Rho (IT); Giulio Brinati, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 576 days.

(21) Appl. No.: 17/293,973

(22) PCT Filed: Nov. 25, 2019

(86) PCT No.: PCT/EP2019/082477
§ 371 (c)(1),
(2) Date: May 14, 2021

(87) PCT Pub. No.: WO2020/109258
PCT Pub. Date: Jun. 4, 2020

(65) Prior Publication Data
US 2022/0010117 A1    Jan. 13, 2022

(30) Foreign Application Priority Data
Nov. 26, 2018  (EP) .................... 18208223

(51) Int. Cl.
| | | |
|---|---|---|
| C08L 27/16 | (2006.01) | |
| B29C 48/00 | (2019.01) | |
| B29C 48/09 | (2019.01) | |
| C08K 3/04 | (2006.01) | |
| F16L 11/04 | (2006.01) | |

(52) U.S. Cl.
CPC ............ *C08L 27/16* (2013.01); *B29C 48/022* (2019.02); *B29C 48/09* (2019.02); *C08K 3/04* (2013.01); *C08K 2201/005* (2013.01); *C08K 2201/006* (2013.01); *C08L 2203/18* (2013.01); *F16L 11/04* (2013.01)

(58) Field of Classification Search
CPC ........ C08L 27/16; C08F 14/22; C08F 114/22; C08F 214/22; C08F 214/222; C08F 214/225; C08F 214/227; C08K 3/04; B29C 48/09; B29C 48/22; F16L 11/04
See application file for complete search history.

(56) References Cited

U.S. PATENT DOCUMENTS

| 5,660,948 | A | 8/1997 | Barker |
| 2003/0104150 | A1* | 6/2003 | Bonnet ................... C08L 27/16 252/511 |
| 2018/0134886 | A1 | 5/2018 | Bonnet et al. |

FOREIGN PATENT DOCUMENTS

| EP | 1505117 A1 | 2/2005 |
| EP | 2412735 A1 | 2/2012 |

OTHER PUBLICATIONS

TIMREX® SFG15 Technical data sheet (Year: 2018).*
Wypych, George. Handbook of Fillers 2nd Edition p. 92 ChemTEc Publishing (Year: 1999).*
Alger, Mark S.M., "Polymer Science Dictionary", 1989, London School of Polymer Technology, Polytechnic of North London, UK published by Elsevier Applied Science, p. 476.

* cited by examiner

*Primary Examiner* — Marc S Zimmer
*Assistant Examiner* — Jeffrey S Lenihan
(74) *Attorney, Agent, or Firm* — Osha Bergman Watanabe & Burton LLP

(57) ABSTRACT

The present invention relates to a polymeric composition comprising: one or more vinylidene fluoride (VDF) polymers, from 1 to 100 parts, preferably from 2 to 50 parts, more preferably from 2 to 30 parts, even more preferably from 3 to 20 parts by weight for 100 parts of VDF polymer of a plurality of particles of graphite, wherein said particles of graphite have an D90 particle size as measured with laser scattering of less than 50 µm, preferably from 2 to 30 µm more preferably from 2 to 20 µm, even more preferably from 2 to 10 µm and a BET specific surface of from 10 to 50 m$^2$/g, preferably 15 to 35 m$^2$/g. The invention also relates to tubular articles comprising the composition and to their use in oil and gas operations.

14 Claims, No Drawings

POLYMERIC COMPOSITIONS COMPRISING VDF POLYMERS AND GRAPHITE

TECHNICAL FIELD

This application is a U.S. national stage entry under 35 U.S.C. § 371 of International Application No. PCT/EP2019/082477 filed Nov. 25, 2019, which claims priority to European patent application No. 18208223.0, filed on Nov. 26, 2018. The entire contents of these applications are explicitly incorporated herein by this reference.

The present invention relates to a polymeric composition comprising a vinylidene fluoride (VDF) polymer and selected graphite grades. Compositions according to the invention are useful in particular in the manufacture of tubular articles such as pipes for the oil/gas extraction industry, particularly for applications in harsh conditions such as conveying hydrocarbons from an off shore well to a floating off shore unit. Compositions according to the invention reduce the permeation of acid gases such as $CO_2$ and $H_2S$ from the hydrocarbon stream through the layers of the pipe, thus preventing corrosion of its metallic outer armour layers. At the same time compositions according to the invention have good mechanical properties such as elongation at break and yield strain which allow their application in situation where also significant repeated mechanical deformation is involved.

BACKGROUND ART

Off-shore pipelines such as those used to pump crude oil and natural gas ashore or to a floating platform from off-shore drilling rigs and terminals are required to be capable of withstanding very high pressures and temperatures and therefore typically comprise layers made of metals such as iron and steel.

Such pipelines are also required to be flexible so to accommodate relative movements of the source and destination and also to allow transportation and re-use in rolled form. Flexibility is typically achieved by combining metallic layers which provides structure and resistance to pressure, and polymeric layers which seal the tube and prevent migration of materials from the inside to the outside of the pipe.

Flexible pipes for conveying hydrocarbons, also known as flexible risers, are widely used and generally comprise, from the inside of the pipe outward, a metal carcass covered by a polymeric internal sealing sheath, a pressure armour layer, tensile armour layers and a polymeric external sheath to protect the entire pipe and in particular to prevent seawater from penetrating its thickness. The metal carcass and the pressure armour layer are usually made up of longitudinal elements wound with a short pitch and give the pipe its ability to withstand radial force while the tensile armour layers usually consist of metal wires wound at long pitches in order to react axial forces. Flexible risers can be either bonded or unbonded. The present invention finds application in both types.

Polyvinylidene fluoride (PVDF) has been proposed as a material for manufacturing such polymeric internal sealing sheath on account of its chemical resistance to hydrocarbons at temperatures typically between 100° C. and 130° C.

Under operating temperatures and pressures, carbon dioxide ($CO_2$) and hydrogen sulphide ($H_2S$) contained in the hydrocarbons permeate through the polymeric internal sealing sheath into the tensile armour layers and, in the presence of water vapour, cause corrosion of these metal reinforcements. These phenomena can impact mechanical performance of the pipe, particularly in ultra-deepwater applications and consequently reduce the service life of the pipe.

Sour service steel grades for the pressure armour layers and the tensile armour layers are sometimes used to prevent this corrosion effect, however, such steel grades have the drawbacks of being expensive and of having poor mechanical properties, which imposes an increase in the section and the weight of the metal portions in these pipes.

There is therefore a need for improved polymeric compositions usable in the polymeric internal sealing sheath of such flexible pipes which have a reduced permeation from sour gases thus allowing to manufacture such pipes without the drawbacks mentioned above associated to the use of sour steel grades, and in general to prolong the service life of such pipes. Such compositions should also maintain good mechanical properties in order to sustain the repeated strain and compression forces they are subject to during operations, in particular linked to the winding/unwinding of rolls, and to the relative movements of the source and destination locations of the hydrocarbons when e.g. destination is a floating platform. In these conditions one side of the pipe is typically stretched while the opposing side is compressed, and this stretch/compression cycle can be repeated multiple times in different directions.

For these reasons is very important that the materials used in the pipes have a sufficiently high elongation at break and a sufficiently high yield stress so to withstand these stresses for the entire service life of the pipe.

SUMMARY OF INVENTION

The present invention relates to a polymeric composition comprising a VDF polymer and a selected graphite material having low particle size and a BET specific surface in a defined range which excludes materials having a very low or very high BET specific surface.

It has been found that by using compositions according to the invention in flexible pipes e.g. for gas/oil extraction, the permeation rate of sour gases such as $CO_2$ and $H_2S$ is strongly reduced. The compositions of the invention have lower permeation rate if compared with compositions using graphite materials having a larger particle size, and are easier and cheaper to make than compositions using graphite materials having a smaller particle size and a larger BET specific surface. Compositions comprising graphite grades within the most preferred ranges also have improved mechanical properties. These properties allows easy manufacturing and distribution uniformity of the composition and a longer service life also in demanding environments for the articles comprising the composition.

In one aspect the invention relates to a polymeric composition comprising: at least one vinylidene fluoride (VDF) polymer, from 1 to 100 parts, preferably from 2 to 50 parts, more preferably from 2 to 30 parts, even more preferably from 3 to 20 parts by weight for 100 parts by weight of VDF polymer of a plurality of particles of graphite, wherein said particles of graphite have a D90 particle size as measured with laser scattering of less than 50 µm, preferably from 2 to 30 µm, more preferably from 2 to 20 µm more preferably from 2 to 10 µm, and a BET specific surface of from 10 to 50 $m^2/g$, preferably 15 to 35 $m^2/g$.

In another aspect the present invention relates to a tubular article comprising the composition described above.

In a further aspect the present invention relates to multilayer pipes, in particular flexible risers, comprising a tubular article as described above.

The present invention also relates to a method of making the composition of the invention and to a method of making tubular articles comprising the composition of the invention.

In another aspect the present invention relates to the use of the composition of the invention, of tubular articles and multilayer pipes comprising the composition of the invention for transporting hydrocarbons, and specifically in downhole or drilling operations.

DESCRIPTION OF EMBODIMENTS

The polymeric composition of the invention is preferably a thermoplastic composition.

In the composition of the invention, at least one vinylidene fluoride (VDF) polymer is used. Preferably said VDF polymer is a thermoplastic VDF polymer but also a VDF thermoplastic elastomer can be used as detailed below.

For the purpose of the present invention, the term "thermoplastic" is intended to denote polymers and/or compositions which are solid at room or usage temperature, which become soft when heated and become rigid again when they are cooled, without there being an appreciable chemical and physical properties change. Such a definition may be found, for example, in the encyclopaedia called Polymer Science Dictionary. Edited by MARK S. M. ALGER. LONDON: ELSEVIER APPLIED SCIENCE, 1989. p. 476.

The expressions "vinylidene fluoride polymer" or "VDF polymer" are equivalent and used within the frame of the present invention for designating polymers essentially made of recurring units, more that 50% by moles of said recurring units being derived from vinylidene fluoride (VDF).

A VDF polymer useful in the present invention is preferably a polymer comprising:

(a) at least 60% by moles, preferably at least 75% by moles, more preferably 85% by moles of recurring units derived from vinylidene fluoride (VDF);

(b) optionally from 0.1 to 15%, preferably from 0.1 to 12%, more preferably from 0.1 to 10% by moles of recurring units derived from a fluorinated monomer different from VDF; and (c) optionally from 0.1 to 5%, by moles, preferably 0.1 to 3% by moles, more preferably 0.1 to 1% by moles of recurring units derived from one or more hydrogenated comonomer(s), all the aforementioned % by moles being referred to the total moles of recurring units of the VDF polymer.

The said fluorinated monomer different from VDF is advantageously selected in the group consisting of vinyl fluoride ($VF_1$); trifluoroethylene ($VF_3$); chlorotrifluoroethylene (CTFE); 1,2-difluoroethylene; tetrafluoroethylene (TFE); hexafluoropropylene (HFP); perfluoro(alkyl)vinyl ethers, such as perfluoro(methyl)vinyl ether (PMVE), perfluoro(ethyl) vinyl ether (PEVE) and perfluoro(propyl)vinyl ether (PPVE); perfluoro(1,3-dioxole); perfluoro(2,2-dimethyl-1,3-dioxole) (PDD). Preferably, the possible additional fluorinated monomer is chosen from chlorotrifluoroethylene (CTFE), hexafluoroproylene (HFP), trifluoroethylene (VF3) and tetrafluoroethylene (TFE).

The choice of the said hydrogenated comonomer(s) is not particularly limited; alpha-olefins, (meth)acrylic monomers, vinyl ether monomers, styrenic monomers may be used.

Accordingly, a VDF polymer for use in the present invention is more preferably a polymer consisting essentially of:

(a) at least 60% by moles, preferably at least 75% by moles, more preferably 85% by moles of recurring units derived from vinylidene fluoride (VDF);

(b) optionally from 0.1 to 15%, preferably from 0.1 to 12%, more preferably from 0.1 to 10% by moles of a fluorinated monomer different from VDF; said fluorinated monomer being preferably selected in the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom, all the aforementioned % by moles being referred to the total moles of recurring units of the VDF polymer.

Defects, end chains, impurities, chains inversions or branchings and the like may be additionally present in the VDF polymer in addition to the said recurring units, without these components substantially modifying the behaviour and properties of the VDF polymer.

As non-limitative examples of VDF polymers useful in the present invention, mention can be notably made of homopolymers of VDF, VDF/TFE copolymers, VDF/TFE/HFP copolymers, VDF/TFE/CTFE copolymers, VDF/TFE/TrFE copolymers, VDF/CTFE copolymers, VDF/HFP copolymers, VDF/TFE/HFP/CTFE copolymers and the like.

As mentioned above the at least one VDF polymer may be a thermoplastic polymer. Optionally the at least one VDF polymer can be a VDF based fluorinated thermoplastic elastomer comprising at least one elastomeric "soft" block consisting of a sequence of recurring units, said sequence comprising recurring units derived from VDF and recurring units derived from at least one fluorinated monomer different from VDF, and at least one thermoplastic "hard" block consisting of a sequence of recurring units, said sequence comprising recurring units derived from VDF in an amount of at least 85% moles, with respect to the total moles of recurring units of block.

In the present invention, the composition may comprise more than one VDF polymer, and in particular the composition may comprise blends of at least one PVDF homopolymer and at least one VDF-containing copolymer.

Particularly preferred in the present invention are blends of PVDF homopolymer and at least one VDF copolymer selected from the group consisting of VDF/CTFE copolymers and VDF/HFP copolymers.

The melt index of the VDF polymer (of or the mixture of VDF polymers in combination, in case more than one VDF polymer is present) in the composition can be advantageously at least 0.01, preferably at least 0.05, more preferably at least 0.1 g/10 min and advantageously less than 50, preferably less than 30, more preferably less than 20 g/10 min, when measured in accordance with ASTM test No. 1238, run at 230° C., under a piston load of 2.16 kg.

When instead measured in accordance with the same ASTM standard under a piston load of 5 kg the melt index can be advantageously at least 1, preferably at least 2, more preferably at least 5 g/10 min and advantageously less than 70, preferably less than 50, more preferably less than 40 g/10 min, Each VDF polymer for use in the present invention has preferably a melting point ($T_{m2}$) of at least 120° C., preferably at least 125° C., more preferably at least 130° C. and of at most 190° C., preferably at most 185° C., more preferably at most 180° C., when determined by DSC, at a heating rate of 10° C./min, according to ASTM D 3418.

Optionally the compositions of the present invention may comprise a fluoroelastomer in dispersed form wherein said fluoroelastomer consists of a sequence of recurring units from VDF and recurring units derived from at least one fluorinated monomer different from VDF, wherein said elastomer is chemically crosslinked, e.g by dynamic vulcanization.

The composition of the present invention also comprises a plurality of graphite particles in an amount of from 1 to 100 parts, preferably from 2 to 50 parts, more preferably from 2 to 30 parts, even more preferably from 3 to 20 parts by weight for 100 parts by weight of VDF polymer(s). Graphite particles in the present invention have a D90 particle size of less than 50 μm, preferably from 2 to 30 μm more preferably from 2 to 20 μm, even more preferably from 2 to 10 μm when measured with the laser scattering method described below in the experimental section. Graphite particles in the present invention also have a BET specific surface (when measured with the method described below in the experimental section) of from 10 to 50 $m^2/g$, preferably 15 to 35 $m^2/g$.

It has been surprisingly found that the selection of specific D90 size and BET specific surface ranges has a significant influence on several properties of the composition of the invention.

As already anticipated, when considering permeation rate of sour gases such as $CO_2$ and $H_2S$, as it will be shown in the experimental section below, the usage of a graphite material within the selected particle size range has been found to provide a stronger effect than that of graphite material with larger particle size.

It has also been noticed (as it will be described more in detail below) that by using a graphite material with D90 particle size and BET specific surface within the claimed range it was possible to easily manufacture the composition of the invention by simply premixing the VDF polymer in divided form such as powders, pellets, granules or fibers, and the graphite material, so as to provide for a pre-mix, and then processing the pre-mix in an extruder.

Both these effects were even more evident by selecting D90 particle size and BET specific surface within the preferred ranges described herein.

When considering mechanical properties of the polymeric composition, it is expected that the addition of a particulate filler like graphite would impact negatively its mechanical properties. "Elongation at break" and "yield strain" (measured according ASTM D638) are important properties for the practical applications of the compositions according to the invention. In fact when such compositions are formed into tube or pipes, they are subject to high level of elastic deformation, e.g. when rolling and unrolling the pipes, and it is therefore important that pipes and pipe layers comprising compositions of the invention can not only prevent sour gases migration, but also withstand such stresses multiple times without breaking or losing their elasticity.

However it was surprisingly found that by selecting a graphite material having D90 particle size within the most preferred range claimed herein, the negative impact of the presence of graphite particles on these mechanical properties was significantly reduced with respect to compositions comprising larger particle size graphite. Without being bound to a theory it is believed that larger particles can act as starting points for structural failure following mechanical stress so that a lower number of large particles improves those properties.

Therefore compositions according to the invention can be easily manufactured and provide an optimal combination of barrier and mechanical properties which are consequence of the specific combinations of selected fluoropolymer materials and selected graphite grades.

Polymeric compositions according to the invention can be manufactured by mixing one or more VDF polymers in the melted state with a plurality of graphite particles according to the invention. The preferred method for the industrial production of such composition is to use an extruder which is able to thoroughly mix the melt and extrude the mixture of the VDF polymers and graphite particles. This process can be carried out as usual in the art, however the applicants found that some specific process step may further improve the properties of the resulting composition.

In order to achieve better uniformity of the composition the VDF polymer may be provided in divided form such as pellets, granules, powder, beads or fibers, and the like. The polymer in divided form can be pre-mixed in a dry condition, typically without heating the mixture, with mechanical agitation. Pre-mixing may be performed directly in the feeder of an extruder including a blender unit at its main gate. The pre-mix is preferably fed at the main gate of an extruder. In this way the graphite particles are thoroughly mixed within the polymeric matrix so that the individual particles are dispersed and not aggregated. It was surprisingly found that compositions according to the invention manufactured in this way have further improved yield strain and elongation at break if compared with compositions having the same composition but being made using a different method such as e.g. feeding the graphite particles at a side feeder of the extruder.

Without being bound by theory it is believed that this is a consequence of the fact that graphite materials within the selected range tend to homogeneously form a layer covering the VDF polymer particles, likely due to an electrostatic interaction, so that upon melting the graphite is fully dispersed and homogeneously distributed within the composition with relatively little mixing in the meted phase. Instead it has been observed that graphite materials having too large particle size and low BET area tended to separate within the premix, making it difficult to homogeneously distribute within the composition, while graphite materials (as well as graphenes and graphene-like materials) having too small particle size and too large BET specific surface tended to agglomerate also making it difficult to achieve a homogeneous composition.

Preferred extruders for this operation are twin screw extruders.

Once the ingredients of the composition of the invention are fed to the extruder, the VDF polymer(s) is melted and blended with the graphite particles. The mixture can be extruded directly in tubular shape for its final application, bur more preferably is extruded in a divided form such as pellets, granules, beads or fibers which will be processed further at a later stage to manufacture the finished articles.

Polymeric compositions according to the invention find application e.g. in the construction of pipes for the oil and gas industry. A tubular article according to the invention can be obtained by extruding in tubular shape a composition according to the invention. A preferred way to manufacture a tubular article is to provide a composition according to the invention in divided form such as pellets, granules, powder, beads or fibers and introduced it into an extruder which is able to form tubular articles, typically a single screw extruder is preferred to form the compositions of the present invention into a tubular article. Such tubular article can be extruded as a self-supporting tube, or it can be extruded on top of a supporting material such as a rigid metal carcass or other supporting material.

Alternatively a tubular article comprising the compositions of the invention can be made by extruding or otherwise forming the composition of the invention in the shape of a film, layer or tape, and subsequently wrapping said film layer or tape around a support having cylindrical shape. Such support can be removed once the tubular article is formed or maintained as a part of the construction. In order to form a tighter seal at the joints of the of the film, layer or tape, heat can be applied to partially melt the composition using methods common in the art when forming tubes from tapes films or layers.

Tubular articles according to the invention may be used as such or, more commonly, can be incorporated into multilayer pipes with at least one layer comprising or made of the composition of the invention.

Multilayer pipes can be formed with known techniques, e.g. larger pipes can be introduced or formed outside smaller pipes. Alternatively different polymeric compositions can be coextruded together so to form concentric pipes having layers of different composition. For example a composition of the invention may be coextruded with a composition comprising one or more VDF polymers but being free or essentially free of graphite particles thus forming a multilayer pipe having one graphite containing layer and one graphite free layer, particularly wherein the graphite free layer is in an inner position. Such a construction can be beneficial when hydrocarbons are transported under high pressure such as e.g. in flexible risers for oil extraction and can provide a longer service life for such flexible risers. Without being bound by theory it is believed that gas at high pressure may penetrate the first molecular layers of polymers directly in contact with the flow. Such gas, when pressure is reduced to normal can expand and form blistering in such layers. With this construction the graphite containing layers, which is less resistant to mechanical stresses than the graphite free layer, is preserved from blistering thus it is free of possible initiation points which could trigger a mechanical fracture.

As known in the art multilayer pipes such as those used in the oil and gas industry can be "bonded" (i.e. wherein the surfaces of the various layers are bonded to each other) or, "unboned" (i.e. wherein the various layers are free to move independently to some extent within the multilayer structure). In some cases a multilayer pipe can include some layers which are "bonded" among them and other layers which are not bonded to the others.

A preferred multilayer pipe comprising the compositions of the invention is a pipe for recovering hydrocarbons, such as for example a flexible riser for oil and gas extraction. As mentioned before, typically such flexible risers comprise, from the inside of the pipe outward, a metal carcass covered by a polymeric internal sealing sheath, a pressure armour layer, tensile armour layers and a polymeric external sheath. A flexible riser according to the invention comprises a polymeric internal sealing sheath which comprises or is made of a composition according to the invention. In case the polymeric internal sheath includes more than one layer it may have at least one of its layers comprising or made of a composition according to the invention. Such pipes according to the invention combine an excellent resistance to the permeation of sour gases with very good mechanical properties which allow repeated winding and unwinding, even in harsh environments such as off shore boats and platforms, without damaging the pipe. Such pipes are able to withstand the strain occurring in those conditions much better that other pipes wherein the polymeric external sheath layer comprises different grades of graphite.

In flexible risers according to the invention, the polymeric external sheath layer can comprise the polymeric compositions of the invention, but it is preferred that such layer is made of other materials conventional for such application such as described in the art.

A particularly preferred configuration for a multiplayer pipe comprising one tubular article comprising, consisting essentially of or being made of the compositions of the invention, is that wherein an additional tubular article comprising a VDF polymer layer and being essentially free of graphite particles is concentric and more inner in the pipe than the layer comprising, consisting essentially of or being made of the compositions of the invention.

In another aspect the present invention relates to a method for transporting hydrocarbons (e.g. to extract crude oil, especially in off-shore drilling operations or downhole operations) comprising the use of a pipe comprising or being made of the polymeric composition of the invention or of a tubular article according to the invention or of a multilayer pipe according to the invention.

In a further aspect the present invention relates to the use of a pipe comprising a polymeric composition according to the invention or of a tubular article according to the invention or of a multilayer pipe according to the invention in drilling operations or in downhole operations. The composition of the invention provides the pipe with barrier properties and mechanical properties which extend the life of the pipe.

The invention will be now described in more detail in connection with the following examples, whose purpose is merely illustrative and not intended to limit the scope of the invention.

Raw Materials

SOLEF® VDF polymer S50515 from Solvay Specialty Polymers Italy S.p.A.

Graphite Timrex® KS4-D90 4.7 µm from Imerys

Graphite Timrex® CT301-D90 30 µm from Imerys

Graphite Timrex® CT001-D90 81 µm from Imerys

Measurement of $CO_2$ Permeation Rate

Measurement of $CO_2$ permeation rate was carried out using the method ISO 15105-1 at 23° C. and atmospheric pressure. The equipment used was a Versaperm Permeability Meter MK IV. CO2 CP Grade was used, T was 23° C., test was performed at atmospheric pressure (990-1015 mbar). The value of the permeation rate reported in the table below is expressed in accordance with the method as $cm^3(STP)$ $mm/m^2$ atm day.

Measurement of Yield Strain and Elongation at Break

Yield strain and elongation at break were measured according to ASTM D638 with type V specimen at 23° C. with a deformation speed of 10 mm/min.

Measurement of Graphite Powder Particle Size D90

The particle size D90 of the graphite particles before incorporation in the polymer matrix was measured with Laser Diffraction according to the method ISO 13390.

Measurement of Graphite Powder BET Specific Surface

BET specific surface of graphite has been measured in accordance with ASTM D6556-04.

EXAMPLES

The compositions have been prepared in a twin screw extruder Brabender KETSE having a screw diameter of 20 mm and a length-to-diameter ratio of 40. A volumetric feeder was used to feed polymer pellets at the main gate. In examples 2, 4 and 5 graphite powders were dry-blended with VDF polymer by premixing the ingredients for 4 hours with mechanical agitation within the volumetric feeder at the main gate. In example 3, graphite was introduced at a side feeder. Mixing and extrusion was conducted at a set temperature of 230° C. All compositions contained 14 parts by weight of graphite for 100 parts of VDF polymer (SOLEF® 50515).

TABLE 1

| | Graphite D90 part. Size (μm) | BET (m²/g) | Permeation rate | Yield strain (%) | Elongation at break (%) | Process |
|---|---|---|---|---|---|---|
| Ex. 1: | — | — | 47 | 11 | 429 | |
| Ex. 2: | 4.7 | 26 | 16 | 9 | 21 | Main gate |
| Ex. 3: | 4.7 | 26 | | 7 | 10 | Side feed |
| Ex. 4: | 30 | 27 | 14 | 5 | 5 | Main gate |
| Ex. 5: | 81 | 25 | 51 | 5 | 5 | Main gate |

The results show how graphite with large particle size has no effect on permeability, while medium and small particle size graphite effectively prevent sour gas migration.

The results also show how only the small size graphite from Example 2, while having the best profile in terms of permeability, also has the best profile in maintaining the mechanical properties giving only a small reduction in yield strain. Elongation at break for Example 2 is 4 times higher than that for the samples with graphite particles of larger size. Elongation at break for Example 2 is still much lower than the control sample containing no graphite, but this has low practical importance as a value of 21% is sufficient to ensure compatibility in practical application where graphite less materials are used, because anyway a strain beyond 11% would alter the property even of the graphite less material due to the yield strain limit. On the contrary the maximum elongation at break for the samples with medium and high graphite content is insufficient for replacing graphite less materials in all situations where a the material is subject to a significant mechanical stress.

The comparison between examples 2 and 3 show the important role played by the process by which material is made. In Example 2 the small size graphite and the polymer pellets are premixed in a dry state for 4 hours, following this premixing operation the resulting pre-mix is introduced in the extruder at its main gate. In Example 3 only the polymer pellets were introduced at the main gate, while the small size graphite particles were introduced at a side feeder of the extruder. Surprisingly the material obtained in Example 2 has much better mechanical properties than that obtained in Example 3 with an improved yield strain and an elongation at break which is twice as much.

Should the disclosure of any patents, patent applications, and publications which are incorporated herein by reference conflict with the description of the present application to the extent that it may render a term unclear, the present description shall take precedence.

The invention claimed is:

1. A multilayer pipe wherein one of the layers is a tubular article comprising a polymeric composition, comprising:
   at least one vinylidene fluoride (VDF) polymer,
   from 1 to 100 parts by weight for 100 parts by weight of VDF polymer of a plurality of particles of graphite wherein:
   said particles of graphite have a D90 particle size as measured with laser scattering of less than 50 μm and a BET specific surface area of from 15 to 50 m²/g.

2. The multilayer pipe according to claim 1 wherein said at least one VDF polymer is a thermoplastic polymer.

3. The multilayer pipe according to claim 1 wherein a layer comprising at least one VDF polymer and being free of said graphite compound is adhered to at least a portion of the inner surface of said tubular article.

4. The multilayer pipe according to claim 1 which is a bonded or unbonded flexible riser for oil and gas extraction, said flexible riser comprising, from the inside to the outside, an inner metal carcass, a polymeric internal sealing sheath, and a metallic tensile armour layer.

5. A flexible riser according to claim 4 wherein said polymeric internal sealing sheath comprises or is a tubular article.

6. A method for manufacturing a multilayer pipe according to claim 1, the method comprising:
   providing at least one vinylidene fluoride (VDF) polymer
   providing from 1 to 100 parts by weight for 100 parts by weight of VDF polymer, of a plurality of particles of graphite, said plurality of particles having a D90 particle size as measured with laser scattering of less than 50 μm and a BET specific surface area of from 15 to 50 m²/g,
   introducing said VDF polymer and said plurality of particles of graphite into an extruder, and
   extruding said VDF polymer with said plurality of particles of graphite.

7. The method according to claim 6 further including the step of premixing said VDF polymer in divided form with said plurality of particles of graphite, so as to obtain a premix, and introducing the resulting premix to the main gate of said extruder.

8. The method according to claim 7, wherein the divided form is selected from the group consisting of pellets, granules, powder, beads and fibers.

9. A method of making a multilayer pipe according to claim 1 comprising the step of extruding the polymeric composition in the shape of a tube.

10. A method of making a multilayer pipe according to claim 1, said method comprising the step of extruding the polymeric composition in the shape of a film, layer or tape and subsequently wrapping said film layer or tape around a support having cylindrical shape, and then, optionally removing said support.

11. A method of making a multilayer pipe according to claim 10, further comprising the step of applying heat to said wrapped film, layer or tape so to at least partially melt it thus forming a sealed tubular article.

12. A method for transporting hydrocarbons, the method comprising using a multilayer pipe according to claim 1 to transport hydrocarbons.

13. A downhole operation comprising the method of claim 12.

14. A drilling operation comprising the method of claim 12.

* * * * *